United States Patent
Saigusa

[19]

[11] Patent Number: 5,882,121
[45] Date of Patent: *Mar. 16, 1999

[54] BEARING SEALING PLATE AND METHOD OF MOUNTING

[75] Inventor: Shigeharu Saigusa, Tenri, Japan

[73] Assignee: Toyo Seal Industries, Co., Ltd, Nara-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 834,862

[22] Filed: Apr. 10, 1997

Related U.S. Application Data

[60] Continuation of Ser. No. 512,204, Aug. 7, 1995, abandoned, which is a division of Ser. No. 149,524, Nov. 9, 1993, abandoned.

[30] Foreign Application Priority Data

Nov. 10, 1992 [JP] Japan ................................. 4-324878
Oct. 29, 1993 [JP] Japan ................................. 5-294560

[51] Int. Cl.⁶ ................................................ F16C 33/78
[52] U.S. Cl. ............................................... 384/488
[58] Field of Search ................................ 384/477–489, 384/129–153

[56] References Cited

U.S. PATENT DOCUMENTS 2,140,672 12/1938 Gray et al. .
5,037,213 8/1991 Uchida et al. ........................... 384/482

FOREIGN PATENT DOCUMENTS 1477701 4/1967 France .
4135035 4/1993 Germany .
599095 3/1948 United Kingdom .

*Primary Examiner*—Lenard A. Footland
*Attorney, Agent, or Firm*—Birch, Stewart Kolasch & Birch, LLP

[57] ABSTRACT

A sealing device for a bearing, which includes a bearing outer race or inner race having a sealing groove including a vertical face and a horizontal support face, and a bearing sealing plate constituted by an adhesive material applied to one or both faces of a sealing material having a ring-hole or not. The bearing sealing plate is bonded and fixed to the horizontal support face of the sealing groove. There is also disclosed a method of mounting a sealing plate for a bearing, which includes the steps of causing an adhesive material to adhere either to a surface of a bearing sealing plate contacting an outer race or inner race of the bearing, or to the surface of the outer race or inner race of the bearing contacting the bearing sealing plate, bringing the bearing sealing plate into contact with the outer race or inner race of the bearing, and bonding and fixing the bearing sealing plate to the outer race or inner race of the bearing for sealing the bearing.

13 Claims, 4 Drawing Sheets

BEARING SEALING PLATE AND METHOD OF MOUNTING

This application is a continuation, of application Ser. No. 08/512,204 filed on Aug. 7, 1995, now abandoned, which is a divisional of application Ser. No. 08/149,524 filed Nov. 9, 1993, now abandoned.

BACKGROUND OF THE INVENTION

Field of the Invention

The present invention generally relates to sealing of a bearing, and more particularly, to a sealing device for the bearing and a mounting method of a sealing plate for a bearing.

In a conventional sealing plate for a bearing, a core metal formed by punching a metallic plate is placed in a recess or concave portion of a metal mold for molding by pouring an elastic material therein, and the bearing sealing plate formed thereby is so adapted that its forward edge diameter is slightly larger than an opening diameter of a bearing sealing groove, and a wall face of the sealing groove of an outer race or inner race of the bearing is sunken so as to force the bearing sealing plate into the sealing groove, thus causing the forward edge portion of the sealing plate to depress the wall face of the sealing groove to achieve the sealing.

In the known bearing sealing plate as described above, there have been disadvantages in that, since the bearing sealing plate is molded by pouring an elastic material into a metal mold and the constructions and shapes of the sealing plate and the bearing sealing groove are complicated. Thus, many steps are needed in the manufacture (for example, in the preparation of the metal mold or removal of burr after the molding, etc.) and these require much time and expense, with a consequent rise in cost.

Meanwhile, miniaturization of various products is now under way, and following such a trend, reduction of the bearing size has been still more strongly demanded. Thus, a bearing sealing plate which can be accommodated in a much smaller space is required. However, in small sized bearings, the sealing groove must be reduced in its diameter, thus making it difficult to be efficiently processed. Also, especially in the case of a deep sealing groove there is another problem in that the strength of the outer race or inner race is undesirably lowered.

Moreover, in the case where the bearing sealing plate is made of a metallic material, proper performance of the sealing plate tends to be obstructed through deformation of the bearing outer race or inner race, with a possibility of leakage of grease from the outer circumferential portion of the bearing sealing plate.

SUMMARY OF THE INVENTION

Accordingly, an essential object of the present invention is to be provide a bearing sealing device and a method of mounting a bearing sealing plate in which the construction of a bearing sealing plate and a sealing groove of a bearing outer race or inner race are simplified or the sealing groove is dispensed with, and thus, the number of manufacturing steps is reduced for facilitation of manufacture, with a consequent reduction of time and cost. Of course, the inventive construction suitable for size must be reduction of the bearing, and the bearing sealing plate must positively maintains the desired sealed state with a lasting mounting strength with respect to the bearing.

In accomplishing this and other objects of the invention there is provided, according to one aspect of the invention, a method of mounting a sealing plate for a bearing. This method includes the steps of: causing an adhesive material to adhere either to a surface of a bearing sealing plate contacting an outer race or inner race of the bearing having a sealing groove or not having the sealing groove, or to the surface of the outer race or inner race of the bearing contacting the bearing sealing plate; bringing the bearing sealing plate into contact with the outer race or inner face of the bearing; and bonding and fixing the bearing sealing plate to the outer race or inner race of the bearing for sealing said bearing.

In another aspect of the present invention, there is also provided a sealing device for a bearing, which includes a bearing outer race or inner race having a sealing groove including a vertical face and a horizontal supporting face, and a bearing sealing plate constituted by an adhesive material applied to one or both faces of a sealing material having a ring-hole or not. The bearing sealing plate is bonded and fixed to the horizontal support face of the sealing groove.

In a further aspect of the present invention, the sealing device for a bearing includes a bearing outer race or inner race not having a sealing groove, and a bearing sealing plate in which an adhesive material is applied onto one face or both faces having a ring-hole or not having a ring-hole, with said bearing sealing plate being bonded and fixed to the surface of said bearing outer race or inner race.

In the above sealing device, the bearing sealing plate is constituted by two kinds of sealing materials including a metallic material and an elastic material.

The adhesive material may be an ordinary one generally available, but should preferably be an elastic material having adhesion.

In still another aspect, the sealing plate mounting method includes the steps of providing on either a bearing outer race or inner race, a sealing groove constituted by a vertical face and a horizontal support face, and formed with a concave portion continuously or intermittently all over an entire periphery on said vertical face, forming a bearing sealing plate by forming an adhesive material layer made of a thermo-plastic resin adhesive material at least on one face of its sealing material, with said adhesive material layer being made thicker than in the previous embodiments either entirely or only in the vicinity of an outer periphery thereof, bringing said bearing sealing plate into contact and with said support face of said sealing groove, with said adhesive material layer of the bearing sealing plate directed downward, heating said bearing sealing plate to fuse the adhesive material, and filling said melted adhesive material by causing said adhesive material to flow into the concave portion at the vertical face of said sealing groove, thereby to solidify said adhesive material through preliminary or forced cooling.

The adhesive material layer may be formed, for example, by applying the adhesive material onto the supporting surface of the sealing groove, instead of providing it on the bearing sealing plate.

The adhesive material or elastic material having adhesive nature adhering to the reverse face of the bearing sealing plate, or the surface of the bearing outer race or inner race or the face of the sealing groove causes the bearing sealing plate to contact and to be fixed to the bearing outer race or inner race, thereby sealing the bearing.

The concave portion formed on the vertical face of the sealing groove allows the melted adhesive material to flow in due to heating and pressurization of the bearing sealing plate inserted in the sealing groove, and by the solidification of the adhesive material which has thus been directed into the concave portion. Such hardened adhesive material increases the mounting strength of said sealing plate with respect to the sealing groove so as to act as a retainer.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like references numerals throughout the accompanying drawings.

Figure 1:
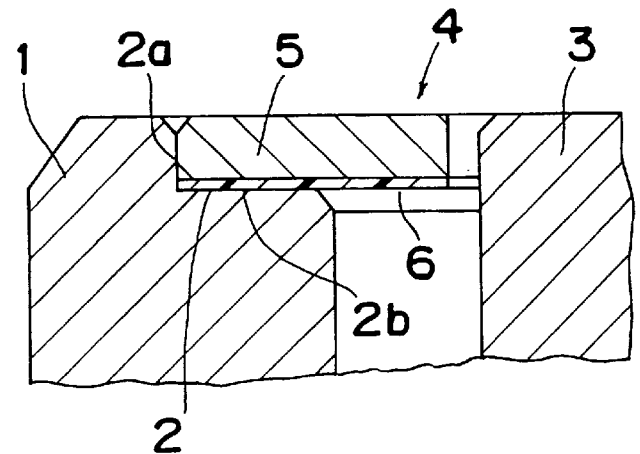
FIG. 1 is a fragmentary cross section showing essential portions of a bearing sealing device according to one preferred embodiment of the present invention.

Referring now to the drawings, there is shown in FIG. 1, a sealing device for a bearing according to one preferred embodiment of the present invention, which generally includes a bearing outer race 1 having a sealing groove 2 including a vertical face 2a and a horizontal support face 2b, a bearing inner race 3 and a bearing sealing plate 4 constituted by an adhesive material 6 applied to one or both faces of a sealing material 5 having a ring-hole or not, and the bearing sealing plate 4 is bonded and fixed to the horizontal support face of said sealing groove 2.

The bearing sealing plate 4 is of a flat plate, and constituted by covering the surface of the sealing material 5 with the adhesive material 6. The sealing material 5 is made of, for example, metal, natural or synthetic rubber, plastics and the like, and is not limited in the raw material therefor so far as it is provided with air tightness.

For the adhesive material layer 6, a material which may be bonded by heating, pressurization or known methods can be used, and although the material itself is not limited, an elastic material with adhering nature including an adhesive material of thermo-plastic property of hot-melt group is preferable.

Figure 2:
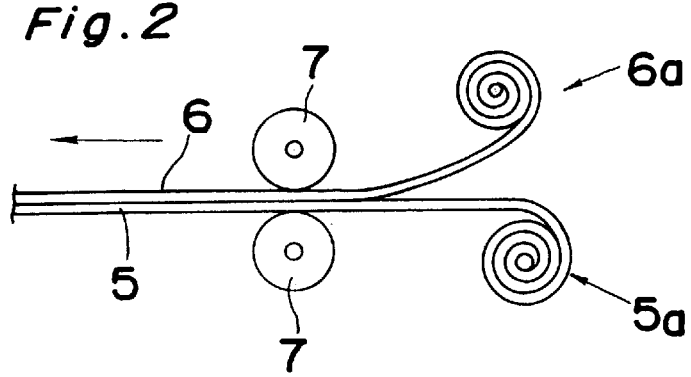
FIG. 2 is a diagram for explaining a method of applying an adhesive material layer on a sealing material.

FIG. 2 shows one embodiment of the adhering method of the adhesive material layer 6 onto the sealing material 5 for the bearing sealing plate 4, in which the sealing material 5 drawn out of its roll 5a, and that adhesive material 6 drawn out of its roll 6a respectively are passed between a set of rollers 7 for adhesion to each other under pressure. From the belt-like sheet thus prepared by adhering the adhesive material layer 6 to the sealing material 5, the bearing sealing plates 4 of a desired size are punched out by metal dies (not shown in FIG. 2).

Figure 3:
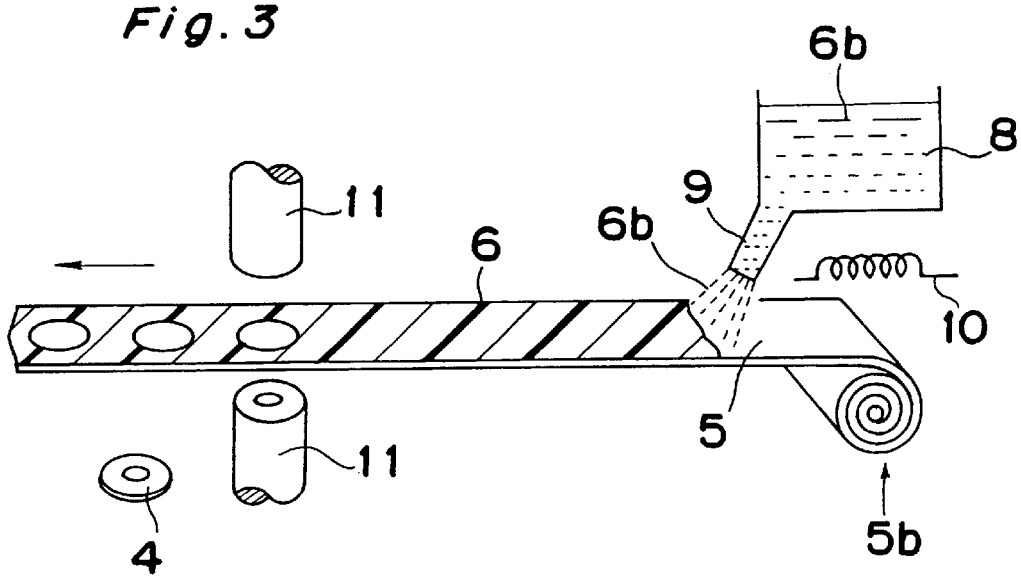
FIG. 3 is a diagram similar to FIG. 2, which particularly shows another method therefor.

FIG. 3 shows another method of producing the bearing sealing plate 4. In this method, the adhesive material 6b contained in a vessel 8 is melted through heating by heating means 10, e.g., an electric heater or the like, and the molten adhesive material 6b is discharged through a nozzle 9 of the vessel 8 onto the upper surface of the sealing material 5 drawn out from a roll 5b, thereby to cause the adhesive material 6b to adhere onto the surface of the sealing material 5. The belt-like sheet thus prepared is blanked by metal dies 11 to prepare the bearing sealing plate 4.

In still another method of providing the adhesive material layer 6 on the sealing material 5, it may be so arranged to pass the sealing material 5 through the molten adhesive material 6b so as to apply the adhesive material 6b onto both surfaces of the sealing material 5.

For mounting such bearing sealing plate 4 as described so far into the sealing groove 2 in the bearing outer race 1, the sealing plate 4 is fitted into the sealing groove 2, with the adhesive material layer 6 directed downwards, and by contacting the adhesive material layer 6 with the support face 2b of the sealing groove 2, the sealing plate 4 is heated from above so as to melt part or all of the adhesive material layer 6, thereby to cause the sealing plate 4 to adhesive to said support face 2b for subsequent cooling and fixing. (FIG. 1).

It should be noted here that the heating of the bearing sealing plate 4 may be effected before contact with the support face 2b of the sealing groove 2, and that the heating means for the heating of the sealing plate 4 is not limited to any specific means.

It should also be noted that the manufacturing method of the bearing sealing plate 4 is not limited to the above, but may, for example, be so modified as to apply the molten adhesive material onto the surface of the sealing material 5 by a sprayer or by a brush.

It is further to be noted that, in the formation of the adhesive material layer on the sealing plate 4, it may be so arranged to cause the adhering material to adhere thereto by painting, spraying or other methods after punching the sealing material 5 in a desired shape.

Moreover, in the embodiment as shown in FIG. 1, it may be so modified that the sealing groove 2 is provided on the inner race 3 instead of being formed on the outer race 1, and the adhesive material layer 6 of the bearing sealing plate 4 is brought into contact with the support face of the sealing groove of the inner race 3 for adhesion by heating. In this case, a lip may be provided on the outer peripheral edge of the sealing plate 4 so as to contact the bearing outer race 1.

Figure 4:
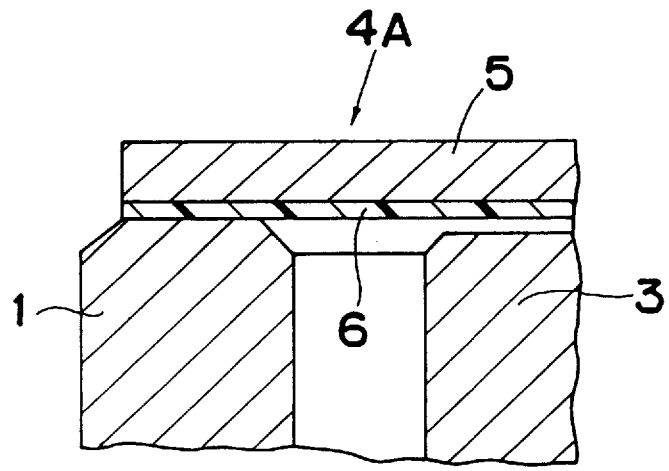
FIG. 4 is a fragmentary cross section showing essential portions of a bearing sealing device according to a modification of the present invention.

In a modification as shown in FIG. 4, it is so arranged that the sealing groove 2 is not provided on the bearing outer race 1, but the sealing plate 4A prepared by causing the adhesive material layer 6 to adhere to the sealing material 5 is adapted to contact the upper surface (in FIG. 4) of the bearing outer race 1 at its side of the adhesive material layer 6, and the sealing plate 4A is heated for subsequent forced or spontaneous cooling, thereby to cause the sealing plate 4A to closely contact and to be fixed to the outer race 1. In this case, a clearance is provided between the upper surface (in FIG. 4) of the inner race 3 and the adhesive material layer 6 or the sealing material 5 as shown.

The bearing sealing plate 4A in a flat disk-like shape may be modified to be a ring-like shape, and further, to be provided with a known lip in a peripheral edge of its inner hole (not shown).

The sealing device in FIG. 4 may be further modified in such a manner that, instead of causing the sealing plate 4A to adhere to the surface of the bearing outer race 1, it may be adapted to adhere to the inner race 3. In that case, it may be so arranged to provide a lip at the outer peripheral edge portion of the bearing sealing plate, so that said lip contacts the bearing outer race.

Figure 5:
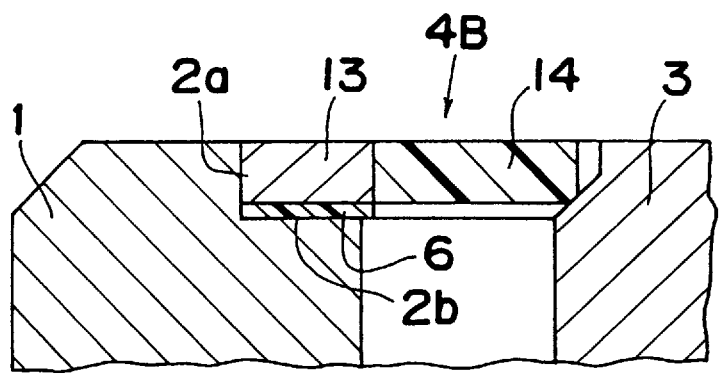
FIG. 5 is a fragmentary cross section showing essential portions of a bearing sealing device according to another modification of the present invention.

The configurations of the bearing sealing plate are not limited to those as shown in FIG. 1 and FIG. 4. In the bearing sealing plate 4B as shown in FIG. 5, the outer peripheral edge portion 13 is made of a metallic material, and its inner peripheral portion 14 is formed by an elastic material, with the adhesive material layer 6 being provided on the outer peripheral edge portion 13. Moreover, the arrangement may be so modified that the inner peripheral portion 14 is made of a metallic material and the outer peripheral portion 13 is formed by an elastic material in the reverse order as above.

In the bearing sealing plates 4 and 4A in FIGS. 1 and 4 also, the sealing material made of two kinds of materials may be employed as in a bearing sealing plate 4B in FIG. 5. In the sealing plate 4A in FIG. 4, the outer peripheral edge portion and the inner portion may be formed either by a metallic material or elastic material.

Figure 6:
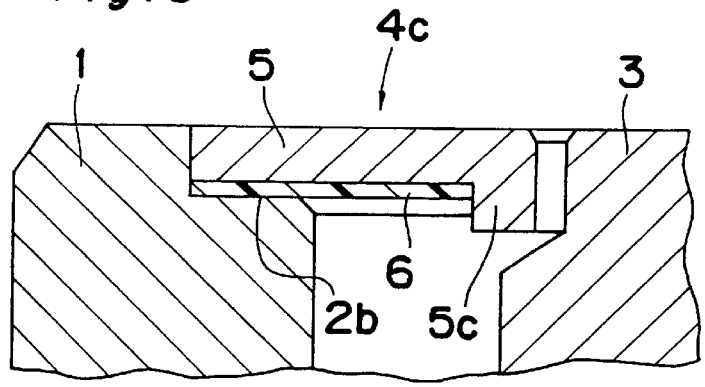
FIG. 6 is a fragmentary cross section showing essential portions of a bearing sealing device according to a further modification of the present invention.

The bearing sealing plate 4C as shown in FIG. 6 is of a ring-like shape, with a ring-shaped protrusion 5C being formed along an inner hole edge of the ring, and the adhesive material layer 6 being provided on the face of the sealing material 5 at its side of the protrusion 5C (excluding the under surface of the protrusion 5C) or on the outer side face of the protrusion SC continuous on said face. The lip in the inner hole of the sealing plate 4C is abbreviated for brevity in the drawing.

In the sealing plate 4C, since the adhesive material layer 6 is not provided on the under surface of the protrusion 5C in the ring-like shape, an unused sealing plate 4C may be overlapped therewith for storing.

Furthermore, the sealing plate 4C, may be so modified to place the outer peripheral portion of the sealing plate 4C on the upper surface (in FIG. 6) of the bearing outer race 1 for use by adhering, without providing the sealing groove 2 on the outer race 1.

Moreover, in the bearing sealing plate 4C, the protrusion 5C may be provided on the outer peripheral edge of the sealing plate, instead of being provided on the ring inner hole edge.

Figure 7:
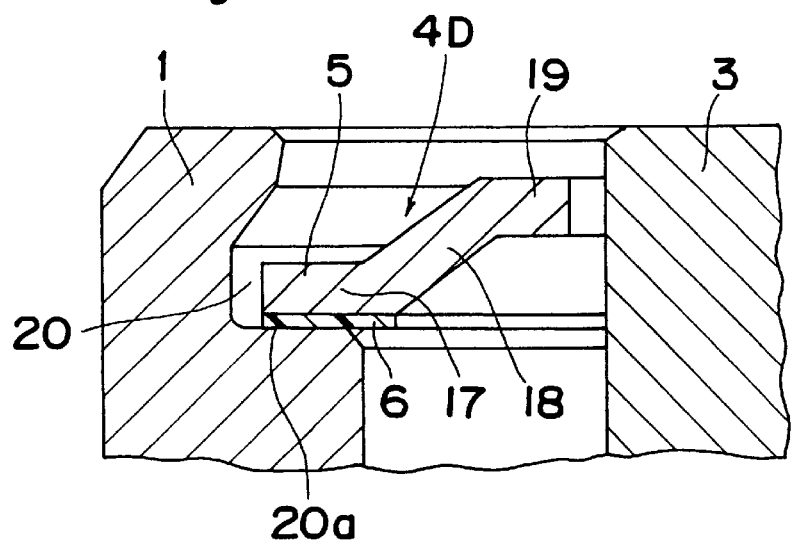
FIG. 7 is a fragmentary cross section showing essential portions of a bearing sealing device according to still another modification of the present invention.

The bearing sealing plate 4D as shown in FIG. 7 is of a ring-shape, and includes an outer peripheral portion 17 in a horizontal plane, an intermediate portion 18 inclined upwardly from the portion 17, and an inner hole edge portion 19 extending horizontally laterally from said intermediate portion 17 as shown, with an adhesive material layer 6 provided on the under surface of said outer peripheral portion 17. A lip (not shown) may further be provided along the inner hole edge.

In the case where the bearing sealing plate 4D is fitted into a sealing groove 20 of a conventional bearing outer race 1 for use, after contacting the adhesive material layer 6 on the under surface of the outer peripheral portion 17 of the fitted sealing plate 4D, with the support face 20a of the sealing groove 20, the sealing plate 4D is heated, and thereafter, cooled so as to be bonded and fixed to said support face 20a.

Moreover, that the bearing sealing plate 4D may be bonded and fixed onto the upper surface (in FIG. 7) of the bearing outer race 1 that is not provided with the sealing groove 20. In such a case, thickness (i.e., height in FIG. 7) of the bearing outer race 1 is made thinner than that of the inner race 3.

Figure 8:
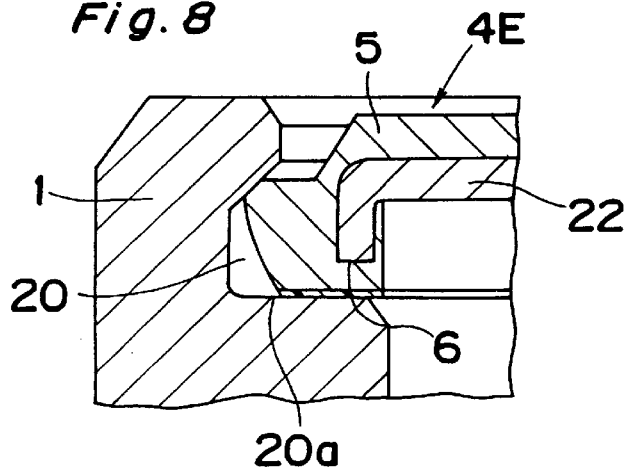
FIG. 8 is a fragmentary cross section showing essential portions of a bearing sealing device according to a further modification of the present invention.

As shown in FIG. 8, it is possible to improve the sealing performance of the conventional bearing by using a conventional outer race 1 provided with the sealing groove 20 and a conventional bearing sealing plate 4E, and providing the adhesive material layer 6 on the surface contacting the support face 20a of the sealing groove 20 at the bottom face of the sealing plate 4E so as to melt the adhesive material 6 through heating for subsequent bonding and fixing. Similar effect may be obtained also with respect to the conventional construction in which the sealing groove is provided on the inner race for fitting of the bearing sealing plate.

Conventionally, in the bearing sealing plates made of metallic materials, there are available the sealing plates of curl type, root type and washer type, each of which, however, has a problem in the sealing performance. Even in the bearing sealing plates of metallic materials, the sealing performance may be improved by providing the adhesive material layer 6 on the surfaces contacting the concave portion of the sealing groove of the outer race or the support face of the sealing groove, and by bonding the metallic sealing plate with the bearing outer race with the adhesive material.

In any of the foregoing embodiments, the layers or films may be formed through employment of the known adhesive material or elastic material with adhesive nature as the adhesive material of the adhesive material layer 6, and the adhesive material is not limited to a thermo-plastic adhesive material.

Moreover, in any of the foregoing embodiments, it may be so arranged to cause the adhesive material to adhere to the surface of the bearing outer race or inner race contacting the sealing plate instead of subjecting the adhesive material to adhere to the sealing plate.

Furthermore, in any of the foregoing embodiments, the adhesion between the bearing sealing plate and the bearing outer race or inner race is not limited to that by the heating method, but heating, pressurization or known methods therefor may be employed according to the nature of the adhesive material.

Figure 9A:
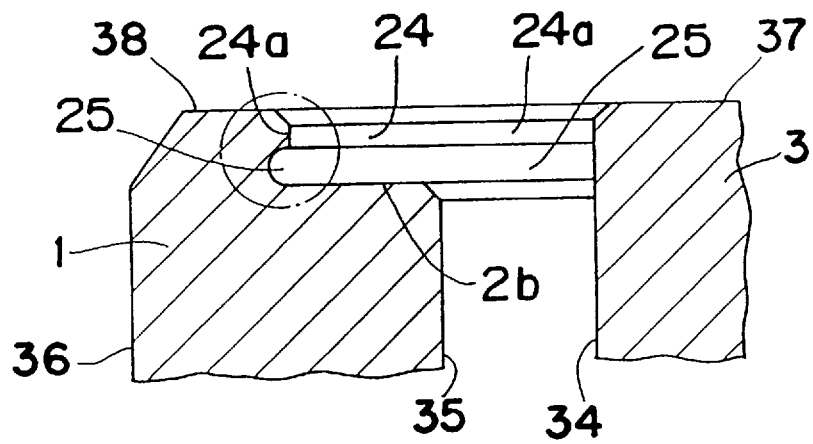
FIGS. 9(A) and 9(B) are fragmentary cross sections for explaining another method of mounting the bearing sealing plate according to the present invention.
Figure 9B:
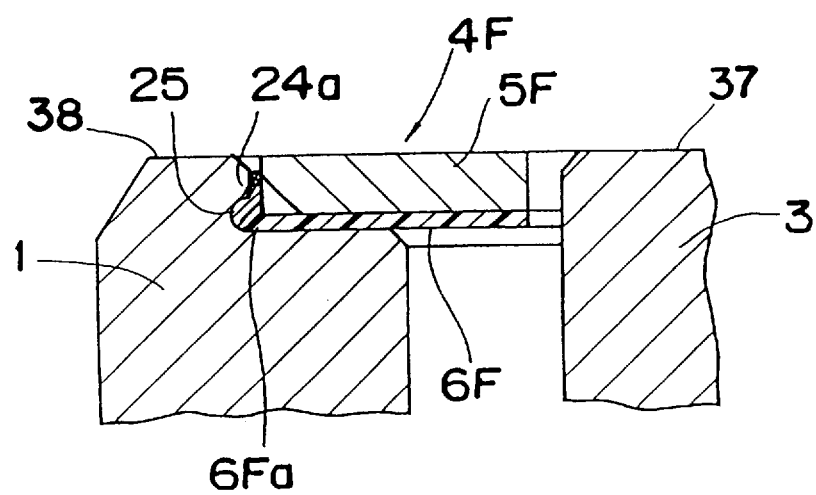

FIGS. 9 (A) and 9(B) show another method for mounting the bearing sealing plate.

Specifically, a sealing groove 24 including a vertical surface 24a and a groove bottom support face 2b is provided on the bearing outer race 1, and a groove side portion 25 of concave configuration is continuously or intermittently formed between the vertical surface 24a and the groove bottom support face 2b.

Referring to FIG. 9A, bearing inner race 3 includes an outer surface 34 and an upper surface 37. Bearing outer race 1 includes an inner surface 35, an outer surface 36, and an upper surface 38.

The bearing sealing plate 4F is provided with a rather thick adhesive material layer 6F of a thermo-plastic resin formed on at least one surface of a sealing material 5F. This adhesive material layer 6F is adapted to be slightly thicker or at least on the outer peripheral portion thereof.

The sealing plate 4F is inserted into the sealing groove 24, with the adhesive material layer 6F directed downward, and thus, the adhesive material layer 6F is caused to adhere to the support face 2b of the sealing groove 24. Then, the sealing plate 4F is heated and pressurized, and part of the molten adhesive material is depressed so as to flow into the concave portion 25 provided in the vertical surface 24a and to be filled therein. Subsequently, the bearing sealing plate 4F is subjected to natural or fo drying, thereby to solidify the adhesive material.

In the bearing sealing plate 4F mounted in the above described method, the protruding portion 6Fa of the adhesive material layer 6F hardened in the concave portion 25 prevents the sealing plate 4F from coming off the sealing groove 24, thus positively maintaining the mounting strength to the bearing outer race.

It should be noted here that the arrangement may, for example, be so modified that the sealing groove 24 is provided on the inner race 3 instead of the outer race 1, with a concave portion equivalent to the concave portion 25 being provided in said sealing groove. In such a case, the bearing sealing plate is provided with a rather thick adhesive material layer of a thermo-plastic resin formed on at least one surface of the sealing material. This adhesive material layer is adapted to be slightly thicker over the entire surface or at least on the inner peripheral portion. In this case, the mounting method of the bearing sealing plate and formation of the protrusion of the adhesive layer and its effect, etc. are similar to those in the above arrangement.

As is clear from the foregoing description, according to the present invention, favorable effects as follows may be obtained.

Since the constructions of the bearing sealing plate, and the sealing grooves in the bearing outer race or inner race are simple for facilitation of manufacture, less time and cost are required in the manufacture as compared with conventional arrangements.

In the manufacture of the bearing sealing plate of the present invention, removal of burr as in the conventional arrangements is not required.

According to the present invention, the sealing groove of the bearing outer race or inner race may be simply constituted by the vertical face and horizontal face, and the wall face of the sealing groove is not required to be curved as in the conventional constructions. Moreover, since the bearing outer race or inner race to formed with the sealing groove itself may be employed, higher strength can be achieved as compared with conventional outer race or inner race.

In the conventional bearings, since the sealing plate is fitted into the sealing groove provided in the bearing outer race or inner race, a space is required therefor, with a consequent increase of diameter and thickness of the bearing, thus presenting a bottleneck for the size reduction of bearings. According to the present invention, however, owing to the fact that the constructions of the sealing groove of the outer race or inner face, and of the sealing plate are simplified, diameter and thickness of the bearing can be reduced for compact size of the bearing.

When the flat sealing material is caused to adhere to the surface of the outer race or inner race without providing the sealing groove on such bearing outer race or inner race, still more compact size of the bearing may be achieved. Moreover, there is also available such an effect that in this case, particular positioning of the bearing sealing plate is not required.

By applying the present invention to the conventional bearing outer race or inner race or to the conventional metallic bearing sealing plates and other sealing plates, sealing performance can be improved.

In the present invention, in the case where the concave portion is provided in the vertical face of the sealing groove, and the adhesive material of the adhesive material layer is continuously directed into said concave portion to be filled therein for solidification, the hardened adhesive material in said concave portion acts as a retainer or anchor for the bearing sealing plate, thereby providing higher mounting strength of the sealing plate.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A sealed bearing which comprises:
   a bearing inner race having an outer circumferential surface;
   a bearing outer race having an inner circumferential surface and an outer circumferential surface; and
   a sealing groove formed in said inner circumferential surface of said bearing outer race, said sealing groove comprising:
      a groove bottom support face extending generally horizontally from said inner circumferential surface toward said outer circumferential surface of said bearing outer race;
      a substantially vertical surface generally orthogonal to said groove bottom support face; and
      a concave-shaped groove portion formed between said substantially vertical surface and said groove bottom support face, said substantially vertical surface being spaced from said groove bottom support face by said concave-shaped groove portion, said concave-shaped groove portion extending throughout at least a portion of a circumference of said bearing outer race,
   wherein said sealed bearing further comprises a bearing sealing plate adhesively bonded with an adhesive material to said groove bottom support face, a gap being formed between the bearing sealing plate and the substantially vertical surface, the adhesive extending into said concave-shaped groove portion and into said gap formed between the bearing sealing plate and the substantially vertical surface.

2. The sealed bearing according to claim 1, wherein a space is formed between said outer circumferential surface of said bearing inner race and said substantially vertical surface, a maximum radial length of said bearing sealing plate being smaller than a minimum radial length of said space.

3. The sealed bearing according to claim 1, wherein an upper surface of said plate is generally co-planar with upper surfaces of said inner and outer races.

4. The sealed bearing according to claim 3, wherein an axial distance between said groove bottom support surface and said upper surfaces of said inner and outer races is substantially the same as an axial thickness of said plate.

5. A sealed bearing, comprising:
   an inner race;
   an outer race;
   at least one of said inner race and said outer race having a sealing groove, said sealing groove having a groove bottom support face and a substantially vertical surface, said substantially vertical surface being substantially orthogonal to the groove bottom support face , a concave shaped groove portion formed between said substantially vertical surface and said groove bottom support face, said substantially vertical surface being spaced from said groove bottom support face by said concave-shaped groove portion, said groove portion extending throughout at least a portion of a circumference of said at least one of said bearing inner race and said bearing outer race; and a bearing sealing plate adhered by an adhesive layer to said groove bottom support face a gap being formed between the bearing sealing plate and said substantially vertical surface, the adhesive extending into said concave-shaped groove portion and into said gap, said bearing sealing plate including a portion made of metallic material and a different portion made of elastic material.

6. The sealing device of claim 5, wherein a surface of the other of said at least one of said inner race and said outer race faces said substantially vertical surface and extends to intersect with an upper surface of said other of said at least one of said bearing inner race and bearing outer race, said other surface being a substantially straight line in cross-section.

7. A sealed bearing which comprises:

a bearing inner race;

a bearing outer race;

at least one of said bearing inner race and said bearing outer race having a sealing groove, said sealing groove having a groove bottom support face and a substantially vertical surface, said substantially vertical surface being substantially orthogonal to the groove bottom support face, a concave-shaped groove portion formed between said substantially vertical surface and said groove bottom support face, said substantially vertical surface being spaced from said groove bottom support face by said concave-shaped groove portion, said groove portion extending throughout at least a portion of a circumference of said at least one of said bearing inner race and said bearing outer race; and a bearing sealing plate adhesively bonded with an adhesive material to said groove bottom support face, a gap being formed between the bearing sealing plate and said substantially vertical surface, the adhesive extending into said concave-shaped groove portion and into said gap.

8. The sealing device for a bearing as claimed in claim 7, wherein said adhesive material is made of an elastic material having adhesion.

9. The sealing device of claim 7, wherein the adhesive in the gap acts as means for holding the bearing sealing plate in position upon release of the bond between the groove bottom support face and the bearing sealing plate.

10. The sealing device of claim 7, wherein a surface of the other of said at least one of said inner race and said outer race faces said substantially vertical surface and extends to intersect with an upper surface of said other of said at least one of said bearing inner race and bearing outer race, said other surface being a substantially straight line in cross-section.

11. The sealing device of claim 10, wherein an opening is defined between said substantially vertical surface and said other surface, the plate being located in the opening, and a minimum radial width of the opening being greater than a maximum radial width of the plate.

12. The sealing device of claim 7, wherein the concave-shaped groove portion and the gap are completely filled with said adhesive material.

13. The sealing device of claim 7, wherein an axial thickness of the plate is greater than an axial length of the substantially vertical surface.

* * * * *